US006972871B2

United States Patent
Tsuda et al.

(10) Patent No.: US 6,972,871 B2
(45) Date of Patent: Dec. 6, 2005

(54) COLOR IMAGE FORMING DEVICE AND METHOD

(75) Inventors: Yu Tsuda, Nakai-machi (JP); Osamu Ide, Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 947 days.

(21) Appl. No.: 09/963,542

(22) Filed: Sep. 27, 2001

(65) Prior Publication Data

US 2002/0085249 A1 Jul. 4, 2002

(30) Foreign Application Priority Data

Sep. 29, 2000 (JP) .............................. 2000-298466

(51) Int. Cl.[7] .............................. H04N 1/52; H04N 1/58
(52) U.S. Cl. ..................... 358/1.9; 358/3.2; 358/3.26; 358/533; 358/536
(58) Field of Search ......................... 358/1.9, 3.2, 3.26, 358/533–536

(56) References Cited

U.S. PATENT DOCUMENTS

| 4,537,470 A | * | 8/1985 | Schoppmeyer ............... 358/515 |
| 5,291,296 A | | 3/1994 | Hains |
| 6,641,241 B2 | * | 11/2003 | Inoue .......................... 358/533 |

FOREIGN PATENT DOCUMENTS

| JP | JP A 6-133156 | 5/1994 |
| JP | JP A 7-92659 | 4/1995 |
| JP | JP A 11-252388 | 9/1999 |
| JP | JP A 2000-85187 | 3/2000 |

OTHER PUBLICATIONS

"Halftone-Angle Combinations for nColor Separations" by Mark Coudray, Screen Printing Journal vol. 3 No.11, Oct. 2003, p. 38-42.*
Ide et al., "Pixel Reproduction on Various Screens", Japan Hardcopy 199, pp.303-306.w/abstract.
Kawamura et al., Halftone Reproduction on Digital Color Printer Based on Electrophotography III—-I H Method and Expansion to the Case with Screen Angles.—, ELECTROPHOTOGRAPHY, The Society Journal, vol. 25, no.1, 1986, pp.31-41. w/abstract.
Kaji, "Electronic Halftoning in prepress", Japan Print Institute Journal, no.28, vol.1, pp.10-21. w/abstract.
Fuji Xerox Technical Report, no. 11, 1996, pp.26-33. w/ abstract.

* cited by examiner

Primary Examiner—Scott A. Rogers
(74) Attorney, Agent, or Firm—Oliff & Berridge, PLC

(57) ABSTRACT

A color image forming device and method prevent occurrence of pile height moires specific to electrophotographic images in low-frequency areas and conventional moires in a digital screen set of four colors. In the color image forming device, by at least one of a halftone generating part and scanning signal forming unit in an image processing unit, differences among screen angles of three dot patterns corresponding to cyan, magenta and black toner images are in the range about 25 to 40 degrees, preferably 30 degrees; the screen angle of a first dot pattern corresponding to a yellow toner image is made equal to that of a second dot pattern corresponding to the toner image of one of cyan, magenta and black; and the screen of the first dot pattern is brought about 150 to 210 degrees, preferably about 180 degrees out of phase with the screen of the second dot pattern.

12 Claims, 8 Drawing Sheets

COLOR IMAGE FORMING DEVICE AND METHOD

BACKGROUND OF THE INVENTION

1. Field of the Invention

The present invention relates to a color image forming device and a method of forming the image, and more particularly to a color image forming device such as an electrophotographic copying machine, printer, facsimile, and a method of forming color images by an electrophotographic system.

2. Description of the Related Art

Conventionally, the formation of color images by a digital electrophotographic system has been performed as described below. First, in an image processing process, input image signals such as color signals of the R (red), G (green), and B (blue) display system, color signals of the L*a*b* display system, and color signals of the cyan (C), magenta (M), yellow (Y), and black (K) display system, which are produced by a scanner, digital camera, computer graphics, or the like, are converted to cyan, magenta, yellow, and black output image signals desirably corrected in accordance with color and gray-scale reproduction properties of a color image forming device. However, depending on a device, they may not be converted to a black output image signal.

Next, the image signals outputted from the above-described image processing process are inputted to a raster output scanner (ROS) having a laser light source or LED light source, and the surface of a photoreceptor is exposed through scanning. Thereby, a charge density distribution (latent image) in accordance with scan exposure patterns is formed on the photoreceptor surface. The latent image is developed by, e.g., toner particles charged in advance in mixture with carrier particles. In short, the amount of deposited toner changes in accordance with the shape state of a latent image, whereby a toner image of a single color is formed.

To form a color image, it is necessary to superimpose toner images of three colors cyan, magenta, and yellow, or four colors, which are the three colors plus the color black. As methods of forming the color image, the following methods have been conventionally used.

(1) A toner image of a single color is superimposed over a toner image of another color on a photoreceptor, this process is repeated by the number of colors, and toner images of all colors thus formed are transferred to a white substrate at a time, whereby a color image is formed on the white substrate.

(2) Images of single colors are transferred for each color to a white substrate wrapped in advance around a transfer drum facing a photoreceptor, and this process is repeated by the number of colors, whereby a color image is formed on the white substrate.

(3) Images of single colors formed on a photoreceptor are transferred for each color to an intermediate transfer drum or intermediate transfer belt facing the photoreceptor, this process is repeated by the number of colors, a color image is temporarily formed on the intermediate transfer drum or intermediate transfer belt, and the color image is transferred again to a white substrate, whereby a color image is formed on the white substrate.

The color toner image formed on the white substrate is heated and fixed to the white substrate by a fixing device having a heating roll and a heating belt, whereby a color image is obtained. Through a series of processes described above, a color image corresponding to input image signals is formed. A toner image pattern of each color is determined by a latent image on the photoreceptor.

By the way, for a method (gray-scale reproduction method) of modulating a latent image pattern according to the strength of output image signals from the image processing process, three modulation schemes are available; first, an area modulation scheme that, with the intensity of a light source constant, blinks the light source, produces a binary exposure pattern by scanning it, and modulates the exposed area coverage; second, a concentration modulation scheme that scans a light source modulated in intensity; and last, a modulation scheme including a combination of the two.

To form electrophotographic images, the area modulation scheme is often used. In this case, as already known, screens having a periodic structure as typified by printing dots and line screens are used to modulate the size and line width of printing dots according to the strength of output image signals, whereby gray-scale reproduction is performed. Generally, the direction of the periodic structure is referred to as a screen angle and a spatial frequency is referred to as a screen line count. It is introduced in Japan Hardcopy '99 (pp. 303–306) that printing dot screens are preferable in terms of graininess and stability of gray-scale reproduction.

The dither method is widely used as a binarization method for gray-scale production by use of printing dot screens. In this case, a screen structure is produced by cyclically arranging a matrix made up of plural pixels. ON/OFF of each pixel within the matrix is decided by comparing a conversion table with an output signal wherein the conversion table is designated as a dither matrix or threshold matrix describing the correspondence between the output image signal and pixel ON/OFF. A printing dot is formed by turning plural adjacent pixels ON or OFF and gray-scale reproduction is performed according to the size of the dot.

Therefore, the number of gray-scale steps corresponds to the number of pixels constituting one matrix, and screen angle and line count are decided by the periodic structure of the matrix. Furthermore, taking into account a development process and a transfer process of an image forming process, it is known that a dot concentration type of an organizational dither method of digital screen schemes is effective (see, e.g., "ELECTROPHOTOGRAPHY—The Society Journal—", Vol. 25, No. 1, pp. 31–44 (1986)).

Generally, in a dot screen, a reference matrix has four adjacent matrices. The dot screen is further classified as an orthogonal screen in which vectors making connection between reference matrices and the barycenters of adjacent matrices are all equal in length and the four vectors are orthogonal to each other, and an oblique screen in which two sets of four vectors are equal in length and deviate by 180 degrees from each other, and the two sets of vectors are not orthogonal to each other.

In an electrophotographic system, since a threshold matrix must be configured with a limited number of pixels from the viewpoint of laser beam size and output speed, the number of gray-scale steps or line count cannot be sufficiently secured in comparison with printing, and screen angles are also low in flexibility. Also, since an alignment error is prone to occur during sequential superimposing of images of individual colors, color variations are liable to occur. For this reason, generally, screen angles of individual colors are preferably made different from each other. In this case, however, a low-frequency moire that is visually recognizable occur due to interference of screens of the colors.

FIG. 12 is a diagram showing a combination of the angles of cyan, magenta, yellow, and black screens in widespread use in conventional industry printing devices and the like. As shown in FIG. 12, to make moires inconspicuous by increasing the above-described spatial frequency, the angles of screens of four colors are set to be 0 degree for yellow Y, 15 degrees for cyan C (or magenta M), 45 degrees for black K, and 75 degrees for magenta M (or cyan C).

For printing onto a white background, since yellow is more inconspicuous to human eyes than other colors, cyan, magenta, and black screens excepting a yellow screen deviate respectively by 30 degrees from each other, and the yellow screen is set so as deviate by 15 degrees from the cyan and magenta screens, respectively.

However, as described previously, in an electrophotographic system, it is impossible to set the differences of screen angles exactly to ±15 or ±30 degrees. Therefore, with actual devices, as described in detail in Mitsuo Kaji, "Electronic Halftoning", Japan Print Institute Journal No. 28 Vol. 1, a rational tangent value close to ±15 or ±30 degrees is selected to set a threshold matrix.

However, due to a deviation of the ideal angle difference ±30 degrees of cyan, magenta, and yellow screens, a moire of a very low frequency occurs in a portion in which the three colors overlap. In the electrophotographic system, setting the angle difference of a yellow screen and a screen of another color to about 15 degrees would cause a conspicuous low-frequency moire.

To solve the problem of the low-frequency moire, various arts have been conventionally proposed. As a first related art, as proposed in Japanese Published Unexamined Patent Application No. Hei 11-252388, control is performed so that additional inking by black toner is not performed in image areas where low-frequency moires occur. According to the first related art, it is in advance determined whether a moire occurs due to superimposed screens, and in a color separation part that produces cyan, magenta, yellow, and black image signals according to input images, additional inking is performed only in color areas where no moire is to occur.

As a second related art, as proposed in Japanese Published Unexamined Patent Application No. 2000-85187, by producing image reproduction signals so that dot screens of individual colors deviate by about 90 degrees/4 (=22.5 degrees) from each other, yellow Y and magenta M screens are moved away from each other by more than the conventional 15 degrees to prevent moire fringes from being stressed in flesh-colored areas.

Furthermore, according to an art proposed in Japanese Published Unexamined Patent Application No. Hei 7-92659, in a digital screen set in which orthogonal screens of three colors are superimposed on top of one another to form a color image, by using a third screen having the same angle and period as a moire spectrum component occurring on the symmetric axis of first and second screens superimposed on each other, an image free of a moire is created in low-frequency areas where moires are visually recognizable.

However, with the above-described first related art, although cyan, magenta, and black moires can be prevented, since no definition is made for yellow and other two colors (cyan and magenta), overlapping with a yellow screen causes a low-contrast moire in low-frequency areas although it is visually inconspicuous. With the second related art, since the angle differences of cyan, magenta, and black screens are also 22.5 degrees, a moire occurs in low-frequency areas more frequently than with the above-described angle difference of 30 degrees. Furthermore, with the third related art, since it targets a digital screen set of three colors, moires in a digital screen set of four colors cannot be suppressed.

By the way, the inventors have found that, in an electrophotographic system, there occur moires (hereinafter referred to as pile height moires) due to the use of powdered toner with large particle size aside from low-frequency moires due to nonlinearity of reflectivity at portions where two screens overlap. In other words, for an electrophotographic image, since toner with large particle size is spread throughout, although the toner layer of a single color is thick, the amount of deposited toner increases in a portion where screens of plural colors overlap, so that a toner layer becomes thicker. As a result, there occur projections and depressions on an image surface because of differences in the thickness of toner layers. The projections and depressions have the same periodic structure as conventional moires and cause cyclic variations of surface reflectivity. They are also recognized as moires.

In printing, since the projections and depressions have a period similar to the wavelength of visible light, no pile height moire occurs. Therefore, low-frequency moires caused by setting the angle difference between a yellow screen that makes it difficult to visually detect a difference from a paper color, and other color screens to about 15 degrees are low in contrast and hardly visually recognized. In the electrophotographic system, however, low-frequency moire components caused by setting the angle difference between a yellow screen and other color screens to about 15 degrees appear as a relatively high contrast because the above-described pile height moires are added.

SUMMARY OF THE INVENTION

The present invention provides a color image forming device and a method of forming the color image that can prevent the occurrence of pile height moires specific to electrophotographic images in low-frequency areas as well as moires pertaining to the first related art, that is, low-contrast moires occurring in low-frequency areas due to overlapping with a yellow screen.

The present invention provides a color image forming device and a method of forming the color image that can prevent the occurrence of pile height moires specific to electrophotographic images in low-frequency areas as well as conventional moires in a digital screen set of four colors.

A color image forming device of the present invention forms an output image corresponding to input image data on a recording medium using pigments of four colors cyan, magenta, yellow, and black, wherein the screen angle of a first output image corresponding to the color image data of yellow is made identical with the screen angle of a second output image corresponding to the color image data of one of cyan, magenta, and black, and the screen of the first output image is brought out of phase with the screen of the second output image.

In the present invention, the differences among the screen angles of three output images corresponding to the color image data of cyan, magenta, and black are set in the range of about 25 to 40 degrees, and the screen angles of first and second output images and the phase relationship of screens of the first and second output images are set so as to satisfy the above-described conditions.

BRIEF DESCRIPTION OF THE DRAWINGS

Preferred embodiments of the present invention will be described in detail based on the followings, wherein:

FIG. 12 is a diagram showing a combination of cyan, magenta, yellow, and black screens in widespread use in conventional industry printing devices and the like.

DESCRIPTION OF THE PREFERRED EMBODIMENTS

Hereinafter, embodiments of the present invention will be described with reference to the accompanying drawings.

Figure 1:
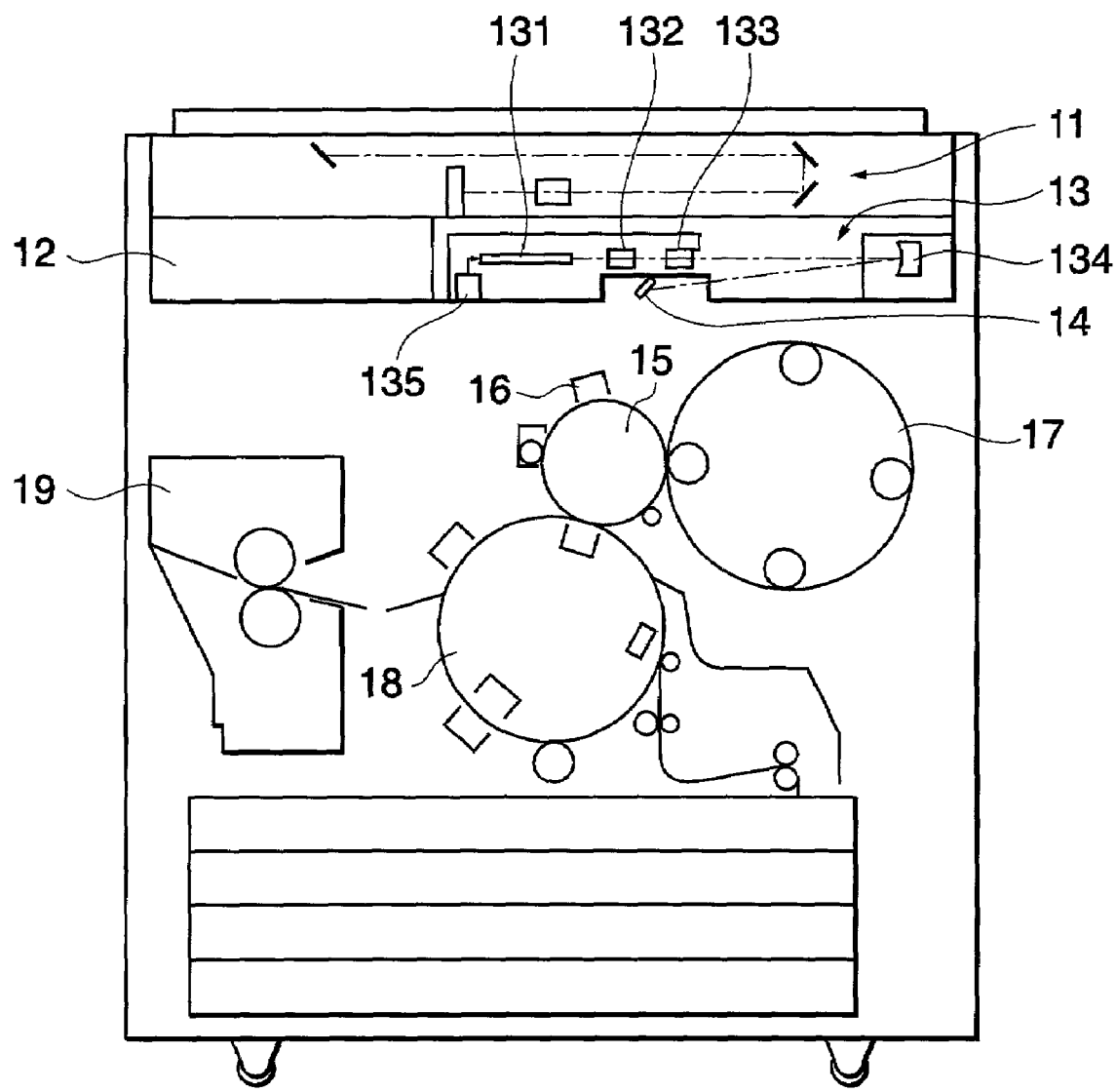
FIG. 1 is a schematic configuration view showing a digital electrophotographic color copier according to one embodiment of the present invention.

FIG. 1 is a schematic configuration view showing a color image forming device according to one embodiment of the present invention, e.g., a digital electrophotographic color copier. However, the present invention, without being limited to application to copiers, is applicable to all electrophotographic color image forming devices such as printers and facsimile.

A color copier of this embodiment includes a scanner unit 11, an image processing unit 12, a ROS optical system 13, a polygonal mirror 14, a photoreceptor 15, a charging unit 16, a rotary developing unit, a transfer drum 18, and a fixing unit 19. The scanner unit 11 reads an original placed on a platen glass and supplies the read image signal to the image processing unit 12 as a multi-value image signal of 8 bits of, e.g., the RGB display system.

Since this embodiment assumes application to a color copier, the color copier is configured so as to input the image signal obtained in the scanner unit 11 to the image processing unit 12. However, in the case of color image forming devices such as a color printer and a color facsimile, image signals from an external image signal input part are inputted to the image processing unit 12. The inputted image signals, without being limited to color signals of the RGB display system, may be color signals of the L*a*b display system and color signals of the CMYK display system.

Figure 2:
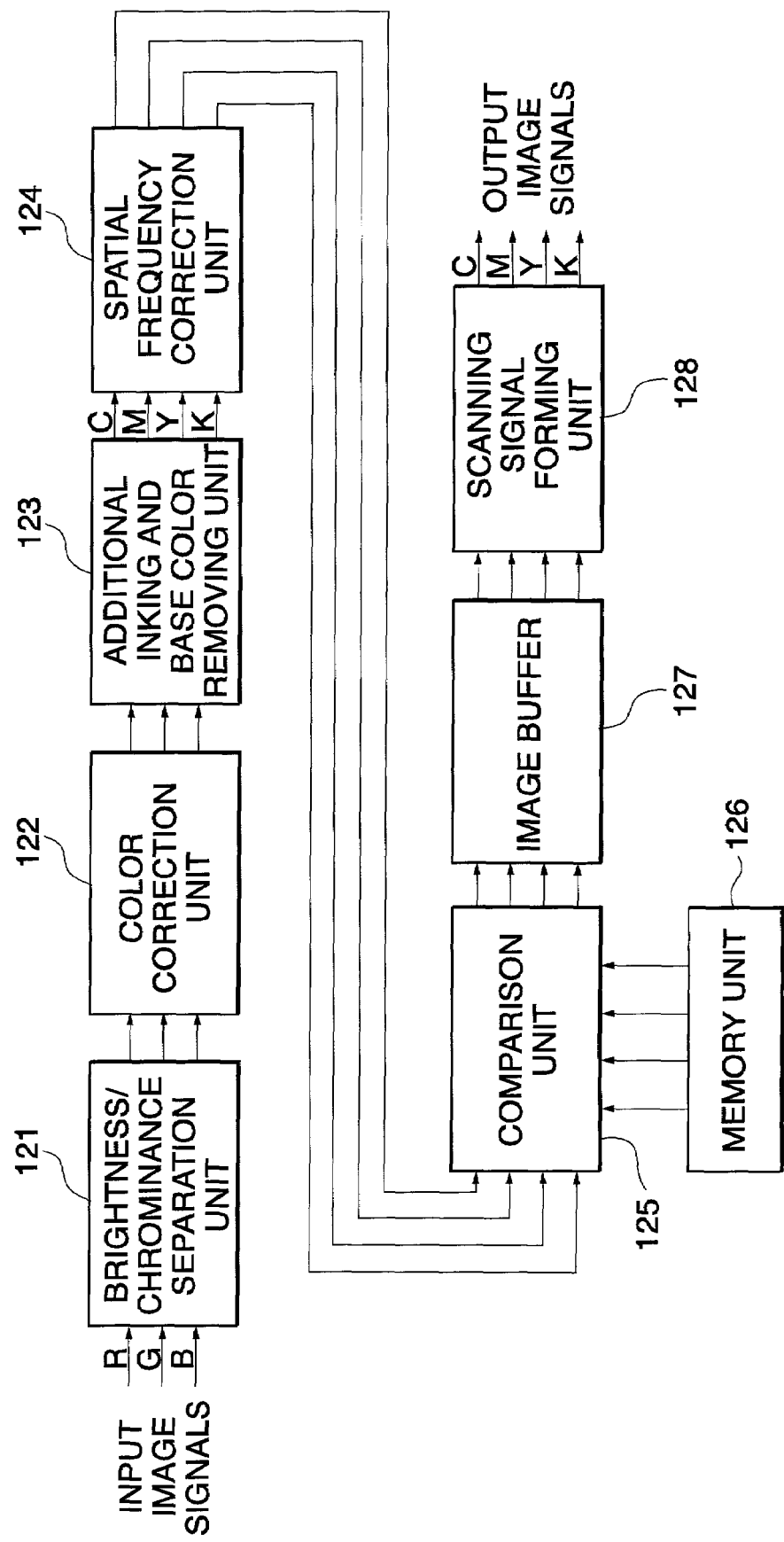
FIG. 2 is a block diagram showing one example of a specific configuration of an image processing unit in a digital electrophotographic color copier.

The image processing unit 12 performs color conversion, color correction, spatial frequency correction, inking, and other various operations on the inputted image signals, and further forms halftone image signals while outputting scanning image signals of binary pulse width modulation tuned to the resolution of the ROS optical system 13 for each scanning line synchronously with a page start signal and/or scanning start signal. FIG. 2 shows an example of a specific configuration of the image processing unit 12.

In FIG. 2, after inputted RGB image signals are separated to brightness signals and chrominance signals in a brightness/chrominance separation unit 121, they are subjected to color correction processing in a color correction unit 122 and then to inking treatment in an additional inking and base color removing unit 123, whereby they are color-separated into CMYK image signals corresponding to 600 dpi. The CMYK image signals are subjected to spatial frequency correction in a spatial frequency correction unit 124 before being supplied to a comparison unit 125.

The comparison unit 125 constitutes, along with a memory unit 126, a halftone generation unit for generating a halftone image signal of a binarized dot pattern shape described later for each color. Namely, in the halftone generation part, the comparison unit 125 compares the inputted image signals with a conversion table described later, stored in the memory unit 126, and halftone image signals having the periodic structure of a screen are generated by controlling ON/OFF of each pixel based on the comparison results.

In the memory unit 126, a conversion table for creating a dot pattern image having a desired periodic structure described later is stored. The conversion table contains a threshold matrix describing a method of successively driving pixels within a matrix into ON or OFF in accordance with an image signal, and information describing periodic structures created by plural matrices.

The halftone image signals created by the halftone generation part including the comparison unit 125 and the memory unit 126 are temporarily stored in the image buffer 127. The image buffer 127 may also be included in the halftone generation part. The scanning signal forming unit 128 outputs the halftone image signals temporarily stored in the image buffer 127 as binary scanning image signals subjected to pulse width modulation synchronously with a page start signal and/or a scanning start signal.

Referring to FIG. 1 again, the binary scanning image signals outputted from the image processing unit 12 are sent to the ROS optical system 13. The ROS optical system 13 is provided with a light source 131 as an exposing unit, and a collimator 132, an fθ lens 133, and cylindrical lens 134 which constitute an image forming unit. As a light source 131, a known light source such as a laser light source and LED can be used. Herein, as an example, a laser light source is used.

In the ROS optical system 13, a laser driving circuit 135 generates, in accordance with the binary scanning image signals sent from the image processing unit 12, a laser driving signal for blinking a laser beam to blinkingly drive the laser light source 131. The laser beam passes through an optical system including the collimator 132, fθ lens 133, and cylindrical lens 134 to form an image on the photoreceptor 15. Preferably, the size of a light beam formed on the photoreceptor 15 is almost the same as pixel size and is almost equal throughout on the photoreceptor 15.

The laser beam from which the image is formed on the photoreceptor 15 is scanned on the photoreceptor 15 in the direction of fast scan by the polygonal mirror 14. At this time, the position of an image formed on a substrate described later must be finally brought into sync with the position of the image on the photoreceptor 15. The polygonal mirror 14 is a conventional scanning part and generates the scanning start signal described previously. In synchronization with the scanning start signal, a binary scanning image signal is outputted from a scanning signal forming unit 128 (see FIG. 2) of the image processing unit 12.

The photoreceptor 15 is driven in the slow-scanning direction by a driving part not shown, to form an electrostatic latent image of a desired dot pattern described later. In the case where the photoreceptor 15 is of cylindrical shape, preferably, the photoreceptor 15 is driven with the center axis thereof as center by a motor or the like, while, to reduce the speed variations of the photoreceptive surface to effect the periodic structure of dot screen, it is desirable to use a servomotor as a driving part.

The charging unit 16 is used to charge the photoreceptor 15 before exposing it to light. As the charging unit 16, a known charging unit such as a charging corotron and a charging roll can be used. However, for the purpose of obtaining an even charging potential throughout on the photoreceptor 15, it is desirable to use a corotron charging unit with a grid and a wire electrode disposed on the front of a charging corotron.

A rotary developing unit 17 is a toner image developing part for adhering toners (pigments) of the colors cyan, magenta, yellow, and black each from 1 $\mu$m to 15 $\mu$m in volume particle diameter to an electrostatic image. Although known toners may be used, they must be 1 $\mu$m to 15 $\mu$m in volume particle diameter. This is because a toner particle diameter of less than 1 $\mu$m would make it difficult to obtain a uniform image without background fog, and a toner particle diameter more than 15 $\mu$m would make it impossible to reproduce dots of a highlight portion at a stable size, so that, in either case, the smoothness and granularity of images would be impaired.

The rotary developing unit 17, or a toner image developing part adheres charged toner particles faithfully to a charge distribution of an electrostatic latent image. As the toner image developing part, known developing units such as non-magnetic two-component development, magnetic one-component development, and non-magnetic one-component development may be used. The non-magnetic two-component development is desirable considering faithfulness to a charge distribution of an electrostatic latent image.

The transfer drum 18 transfers toner images to a white substrate. The white substrate means white paper or film about 30 to 300 $\mu$m in thickness having the characteristics that, when L*a*b* defined by CIE is measured in the condition of a view angle of D50/2 degrees using X-rite968 (manufactured by X-rite Co., Ltd.), L* is 80 or more, and C* (the square root of the sum of the square of a* and the square of b*) is 10 or less.

As a transfer unit, without being limited to the transfer drum 18 which is used in this embodiment, there can be used a known transfer unit having the function of applying voltage to a transfer corotron or a transfer roll facing the photoreceptor 15 with a substrate sandwiched between them to transfer a toner image on the photoreceptor 15 to the white substrate by electrostatic force.

In a color copier of this embodiment, to produce a color image, toner images of four colors are transferred onto the white substrate. This can be desirably achieved by any of the following parts: a part which transfers images of four colors formed on the photoreceptor 15 at a time to the white substrate by a transfer corotron or a transfer roll placed with the white substrate sandwiched; a part which in advance absorbs a white substrate to a transfer drum or a transfer roll having a transfer corotron or a transfer roll provided on the back thereof, and transfers developed toner images to the white substrate four times, one for each color; and a part which successively transfers an image of each color to an intermediate roll or intermediate belt having a transfer corotron or a transfer roll provided on the back thereof, and then transfers the images onto a substrate using the transfer corotron or the transfer roll facing the intermediate roll or intermediate belt with the white substrate sandwiched between them.

The fixing unit 19 bonds powdered toner particles and the white substrate together. As the fixing unit 19, there can be used known units such as a thermal roll fixing unit, an open fixing unit, a radiant fixing unit, a pressure fixing unit, and the like.

Next, a description will be made of the operation of the color copier configured as described above, of this embodiment. A pixel size to form a color image, which depends on the configuration of screen generator, the rotation speed of the polygonal mirror 14, and the movement speed of the surface of the photoreceptor 15, is assumed to be 4800 dpi in the fast-scanning direction and 1200 dpi in the slow-scanning direction in this embodiment. Since an orthogonal screen is used, the basic unit of rational tangent values is 1200 dpi. The present invention is not limited to orthogonal screens and is also applicable to inclined screens.

First, by reading an original image in the scanner unit 11, image signals are inputted to the image processing unit 12 from the scanner unit 11. The image processing unit 12 performs color conversion, color correction, spatial frequency correction, inking, and other operations on the inputted image signals, and color-separates them to cyan, magenta, yellow, and black image signals corresponding to 600 dpi.

The image signal processing unit 12 further generates, in a halftone generation part including the comparison unit 125 and the memory unit 126, a halftone image signal of a binarized dot pattern shape described later for each color. That is, in the comparison unit 125, a conversion table stored in the memory unit 126 and the image signals are compared, and halftone image signals having the periodic structure of screens are generated by controlling ON/OFF of each pixel.

The halftone image signals are temporarily stored in the image buffer 127 and are outputted to the laser driving circuit 135 of the ROS optical system 13 as binary scanning image signals of pulse width modulation tuned to the resolution of the ROS optical system 13 for each scanning line, synchronously with a page start signal and/or a scanning start signal. The laser driving circuit 135 blinkingly controls the laser light source 131 in accordance with the scanning image signals. A laser beam emitted from the laser light source 131 passes through an optical system including the collimator 132, f$\theta$ lens 133, and cylindrical lens 134 to form an image on the photoreceptor 15, and the photoreceptor 15 is fast-scanned by the polygonal mirror 14.

The photoreceptor 15, which is of cylindrical shape, rotates around the center axis by using a servo motor as a driving source so that the speed of the photoreceptor surface is 160 mm/sec. The photoreceptor 15 is evenly charged in advance by the corotron charging unit 16 so that the surface potential thereof is about −700 V. An electrostatic latent image is formed by applying a laser beam to the photoreceptor 15 and decreasing the potential of an exposing part. The light amount of the laser light source 131 is adjusted so that a surface potential when the whole surface is exposed to light is −200 V.

The electrostatic latent image is developed by one of four-color two-component developing units disposed on the rotary developing unit 17. A development bias of an AC component of 9 kHz, 1 kVp-p and a DC component of −500

V is applied to a development roll surface. As a developing agent, for each color, a mixture of toner 7 µm in particle diameter and magnetic core particles 50 µm in particle diameter mixed with coated carrier is used. The mixture ratio of the toner and carrier is adjusted so that a development toner weight per unit area when the whole surface is exposed to light is about 50 g/m².

The developed toner images formed on the photoreceptor 15 are transferred, for each one color, to the white substrate electrostatically absorbed in advance to the transfer drum 18, using the transfer corotron provided on the back of the transfer drum 18. After the cyan, magenta, yellow, and black toner images are successively transferred to the white supply material and the toner images of four colors are transferred onto the white substrate, a recording sheet is detached from the transfer drum 18. The toner images are heated and fused by the fixing unit 19 to be bonded with the white substrate. The toner layer thickness at a monochrome solid portion of an image thus obtained, that is, pile height is about 4 µm.

In the image forming device according to this embodiment as typified by the color copier having been described above, by at least one of the halftone generating part (the comparison unit 125 and the memory unit 126) and the scanning signal forming unit 128 in the image processing unit 12, the angle differences among three dot patterns corresponding to the cyan, magenta, and black toner images are in the range of about 25 to 40 degrees, preferably about 30 degrees; the screen angle of a first dot pattern corresponding to a yellow toner image is made equal to the screen angle of a second dot pattern corresponding to the toner image of one of colors cyan, magenta, and black; and the screen of the first dot pattern is brought about 150 to 210 degrees, preferably about 180 degrees out of phase with the screen of the second dot pattern.

In this way, by setting the range of the angle differences among the three dot patterns for forming the cyan, magenta, and black toner images, the screen angles of the first and second dot patterns, and the phase relationship of the screens of the first and second dot patterns to satisfy the above-described conditions, the described purpose of forming images free of conventional moire of low frequency as well as pile height moire can be achieved.

Namely, in the case where a yellow toner image is formed on the white substrate, since the dots are difficult to view, color variations caused by speed variations of the device are little visible. Also, since moire caused by a yellow toner image and a toner image of another color does not occur at low-frequency areas where it is easily visible, pile height moire, which is a problem specific to electrophotographic devices, is not visually detected.

This embodiment has been described on the assumption that the range of the angle differences among the three dot patterns for forming the cyan, magenta, and black toner images, the screen angles of the first and second dot patterns, and the phase relationship of the screens of the first and second dot patterns satisfy the above-described conditions at the same time. However, this is the most desirable configuration and the present invention is not limited to it.

To be more specific, a configuration can also be taken in which the screen angle of a dot pattern corresponding to a yellow toner image is equal to that of a second dot pattern corresponding to the toner image of one of cyan, magenta, and black, and the screen of a first dot pattern corresponding to a yellow toner image is equal to or more than 150 degrees, and equal to or less than 210 degrees out of phase with the screen of the second dot pattern.

This configuration can also arrest not only the occurrence of pile height moire but also the occurrence of low-contrast moire generated at low-frequency areas caused when the screen of a first dot pattern corresponding to a yellow toner image is superimposed. An image of higher quality can be formed by positively arresting the occurrence of low-contrast moire generated at low-frequency areas by an overlap of a yellow toner image and a different color toner image although the periodic structure itself produced by the toner image of yellow alone is visually inconspicuous.

The phase φ of screen is obtained by the following expression from the ratio of a real component R and an imaginary component I of main spectrums obtained by Fourier transform for an image in which a delta function is assumed to be set in the barycenter of screen cells.

$$\phi = \tan^{-1}(I/R)$$

Hereinafter, a description will be made of concrete embodiments for achieving the above-described screen structure.

[First Embodiment]

In a first embodiment, in order that the array of dot patterns is in the above-described range, the data to be stored in the memory unit 126 of the halftone generating part is set so that the angle differences among three dot patterns corresponding to the cyan, magenta, and black toner images are in the range of about 25 to 40 degrees, preferably about 30 degrees.

The array information of screen cells to be stored in the memory unit 126 is set so that screen angles fall within the above-described range, that is, the screen angles of first and second dot patterns are equal. At this time, screen line counts are also set so as to be equal between the first and second dot patterns. Furthermore, in the comparison unit 125, setting is made so that the phases of the first dot pattern and the second dot pattern fall within the above-described range, that is, the screen of the first dot pattern is equal to or more than about 150 degrees and equal to or less than about 210 degrees, preferably about 180 degrees out of phase with the screen of the second dot pattern.

For the screen angles and line counts of the first and second dot patterns, and the phase relationship of the screens of the first and second dot patterns, the array information of screen cells to be stored in the memory unit 126 may be set so that the screen line counts and angles fall within the above-described range, and in the scanning signal forming unit 128, the phases of the first dot pattern and second dot patterns may be set to fall within the above-described range. Screen line counts are not mandatory conditions.

In this case, in the scanning signal forming unit 128, by changing the timing of issuing a page start signal and a scanning start signal corresponding to a yellow toner image to, e.g., a white substrate position, to the timing of issuing those corresponding to the toner image of one of the colors cyan, magenta, and black, the phases of screens corresponding to yellow and black toner images can be adjusted to fall within a desired range.

Preferably, the second dot pattern should correspond to the black toner image. This is because, since the difference between the reflectivity when a black toner image and a yellow toner image are superimposed and the reflectivity when they are juxtaposed is smaller than that in the combinations of a cyan toner image and a yellow toner image, and a magenta toner image and a yellow toner image, color change occurring when two toner images deviate from each other due to speed variation of the device can be reduced, so that a desired image can be obtained.

It is desirable that one of main spectrums of a yellow or black screen, preferably the largest spectrum, is the same as a differential spectrum between one of main spectrums of a cyan screen, preferably the largest spectrum, and one of main spectrums of a magenta screen, preferably the largest spectrum.

The main spectrums mean the following. The periodic structure of a screen is produced by repeatedly arranging screen cells. Assuming an image in which a delta function is set in the barycenter of the screen cells, of spectrums obtained by Fourier transform for the image, basic spectrums appearing most strongly in low-frequency areas, except for DC components, are the main spectrums.

The spectrums, which are represented on two-dimensional frequency space coordinates (u axis, v axis), have strong spectrum components of basic screen cells and weak harmonic spectrum components at a frequency n times the spectrums. Namely, the main spectrums mean the above-described strong spectrum components. The main spectrum components match a frequency that corresponds to the direction of a vector making connection between the barycenter of one screen cell and the barycenter of the nearest cells and the length of the vector, and more specifically correspond to a screen angle and line count.

In the case where a main spectrum A of a yellow or black screen is different from a differential spectrum B between a main spectrum of a cyan screen and a main spectrum of a magenta screen, a differential vector between the A and B vectors occurs in a low-frequency area, causing a low-frequency moire which is visually recognizable.

By setting cyan, magenta, yellow, and black screen angles and line counts so that they fall within a desired range, the A and B vectors can be made identical. However, as disclosed in Japanese Published Unexamined Patent Application No. Hei 6-133156, in a multi-center screen having multiple dot centers within a threshold matrix, main spectrums depend on not the periodic structure of the threshold matrix but the periodic structure of the barycenter of the nearest dots.

It is desirable that all the four screens are 200 lines per inch or more. Namely, if all the four screens are 200 lines per inch or more, a formed image is viewed with dots appearing inconspicuous, with the result that moires are also more inconspicuous, so that a high-quality image can be formed.

Furthermore, it is desirable that the brightness/chrominance separation unit 121, the color correction unit 122, and the additional inking and base color removing unit 123 or a color separation part in the image processing unit 12 form a black toner image only in low-brightness and low-chroma color areas. Particularly, it is further desirable that a black toner image is formed only in color areas where C* is 40 or less and L* is 40 or less.

This can be achieved by using a color correction unit provided with a color conversion table in which colors are separated to fall within the above-described range. Where a black toner image is formed in a low-chroma and low-brightness area, since the amount of the toner image is plentiful throughout the area, no pile height moire will not occur because of the spread of the toner image in the process of transfer and fixing. However, if a black toner image is formed in a high-chroma and high-brightness area, a pile height difference in the area becomes large and the exposure of a substrate itself occurs, so that a pile height moire is liable to occur.

As a method of deciding the amount of a black toner image, it is desirable to use a flexible GCR method described in "Fuji Xerox Technical Report, No. 11 (1996), pp. 26–33."

Figure 3:
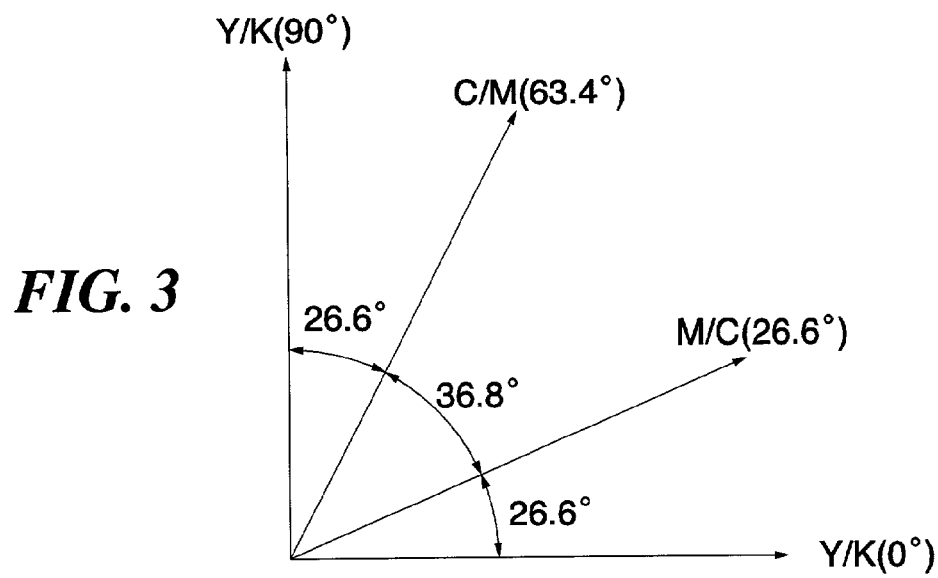
FIG. 3 is a diagram showing a combination of screens of individual colors in a first embodiment of the present invention.
Figure 4:
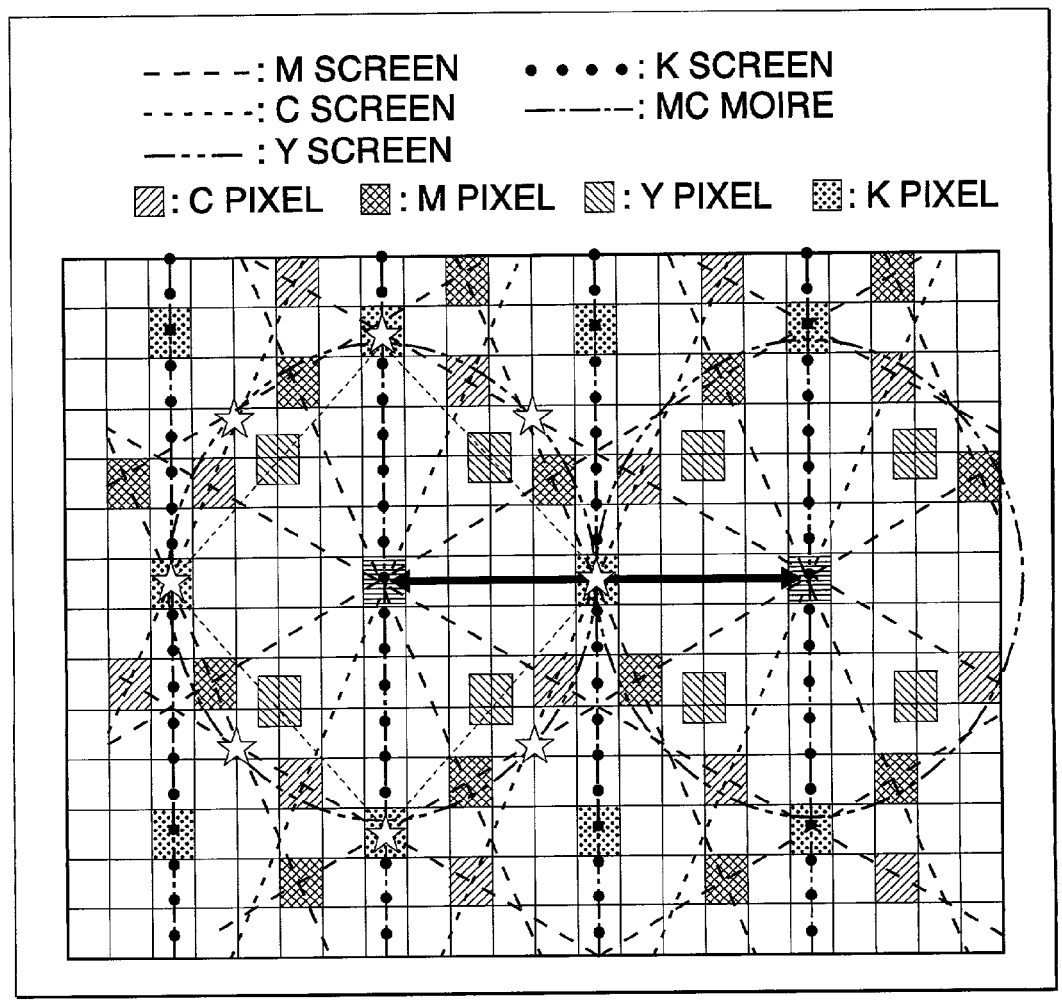
FIG. 4 is a schematic diagram of a two-dimensional array of cyan, magenta, and black toner images in a first embodiment.
Figure 5:
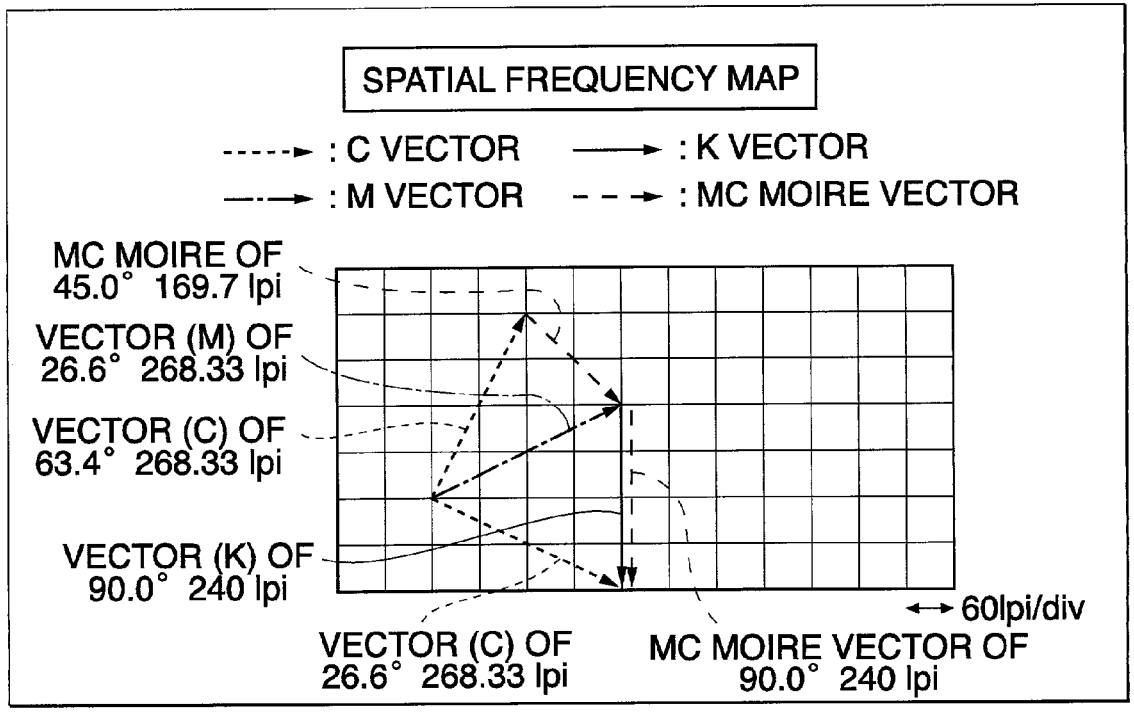
FIG. 5 is a vector representation of main spectrums of cyan, magenta, and black screens in a first embodiment.

First, the structure of screens used in the first embodiment is described. FIG. 3 is a diagram showing a combination of the angles and line counts of cyan, magenta, yellow, and black screens in the first embodiment. FIG. 4 is a schematic diagram of a two-dimensional array of cyan, magenta, and black toner images. FIG. 5 is a vector representation of the directions and line counts of main spectrums obtained by Fourier transform for an image in which delta functions are set in the barycenter of cyan, magenta, and black screen cells.

As seen from FIG. 4, all the screens of the four colors are orthogonal screens and have four spectrums of an identical frequency that intersect at right angles at an origin. In FIG. 4, in comparison of yellow and black screens, they are equal both in line count and angle, and when a particular yellow dot is noted, it is adjacent to four black dots and the barycenter of the noted yellow screen cell is in the barycenter position of the four dots. In other words, the two screens are 180 degrees out of phase.

As apparent from FIG. 3, the angles of three screens of cyan, magenta, and black are 26.6 degrees (including 116.6, 206.6, and 296.6 degrees), 63.4 degrees (including 153.4, 243.4, and 333.4 degrees), and 0 degree (including 90, 180, and 270 degrees), and the angle differences among the three screens are equal to or greater than about 25 degrees, and equal to or less than about 40 degrees.

In FIG. 5, main spectrums of a black screen are 240 lines in line count and 0, 90, 180, and 270 degrees in angle, which match those of differential spectrums between main spectrums of a cyan screen and main spectrums of a magenta screen.

The color image forming device of the above-described first embodiment produces satisfactory images free of pile height moire and conventional moire in low-frequency areas of 100 lines per inch.

[Second Embodiment]

This embodiment is the same as the first embodiment except for a portion related to screen structure, that is, the halftone generation part (the comparison unit 125 and the memory unit 126 in FIG. 2), and color screens are configured so that a rational tangent value of a cyan screen at a resolution of 1200 dpi is 6/2 in the fast-scanning and slow-scanning directions, a rational tangent value of a magenta screen is 2/6, and a rational tangent value of black and yellow screens is 5/5. Furthermore, the yellow and black screens are set so as to be 180 degrees out of phase.

As a result, the angles and line counts of the individual color screens are respectively 18.4 degrees and 189.7 lines for cyan, 71.6 degrees and 189.7 lines for magenta, and 45.0 degrees and 169.7 lines for yellow and black. Also, one of differential spectrums between main spectrums of cyan and main spectrums of magenta is −45 degrees in angle and 169.7 lines in line count, which match those of black and yellow screens.

Figure 6:
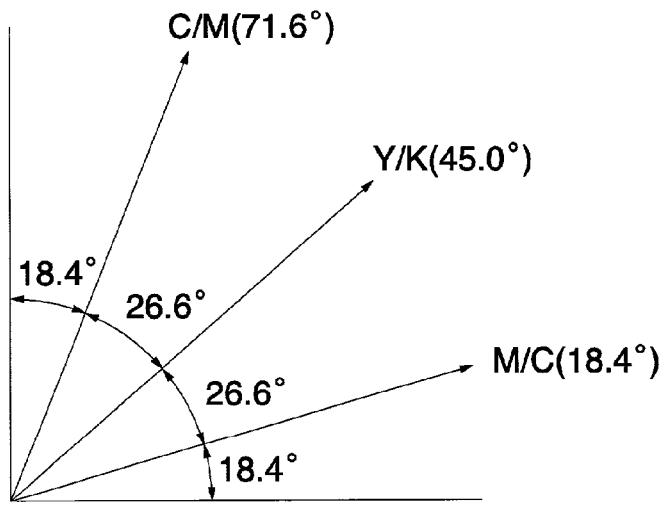
FIG. 6 is a diagram showing a combination of screens of individual colors in a second embodiment of the present invention.
Figure 7:
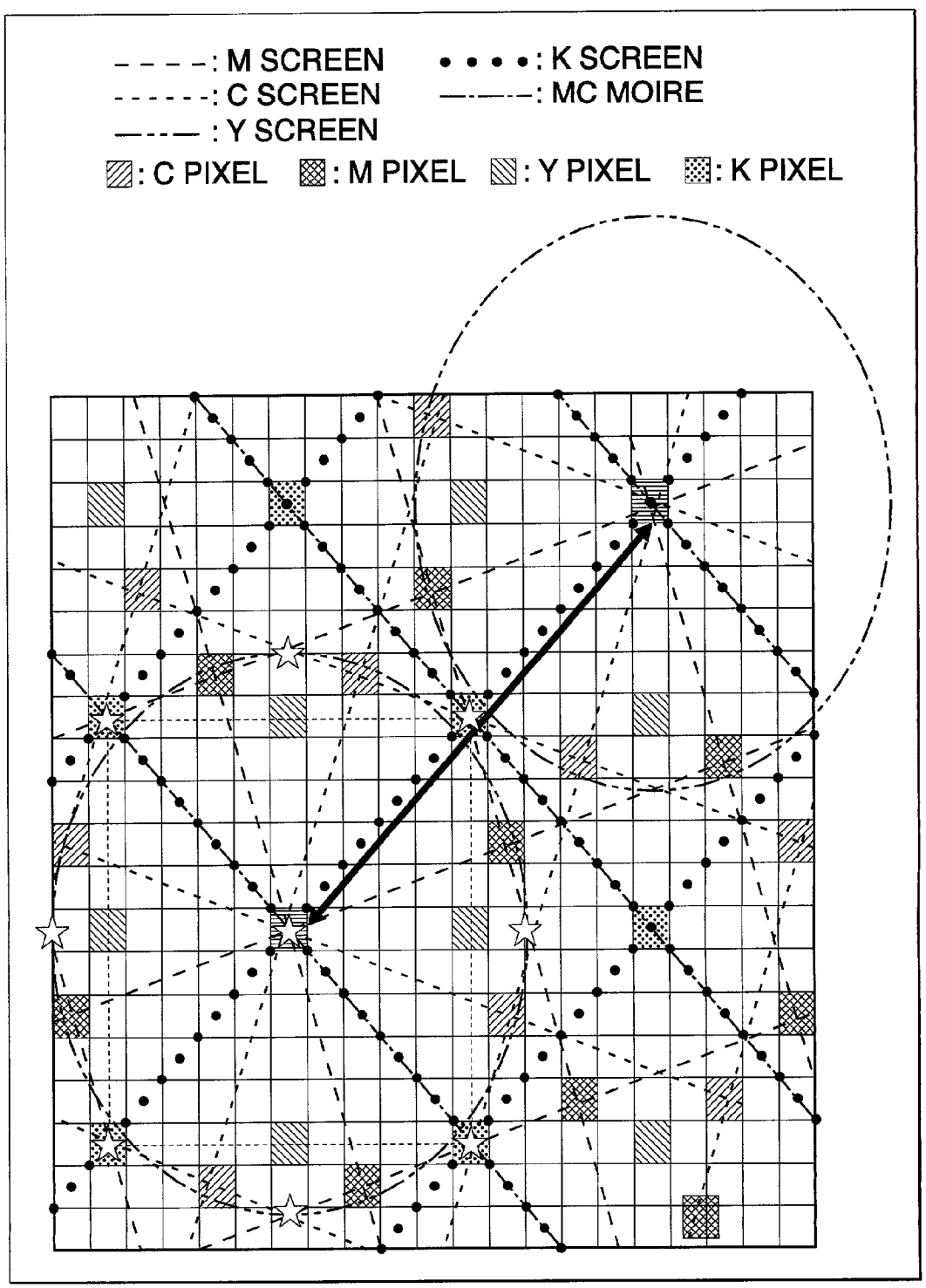
FIG. 7 is a schematic diagram of a two-dimensional array of cyan, magenta, and black toner images in a second embodiment.
Figure 8:
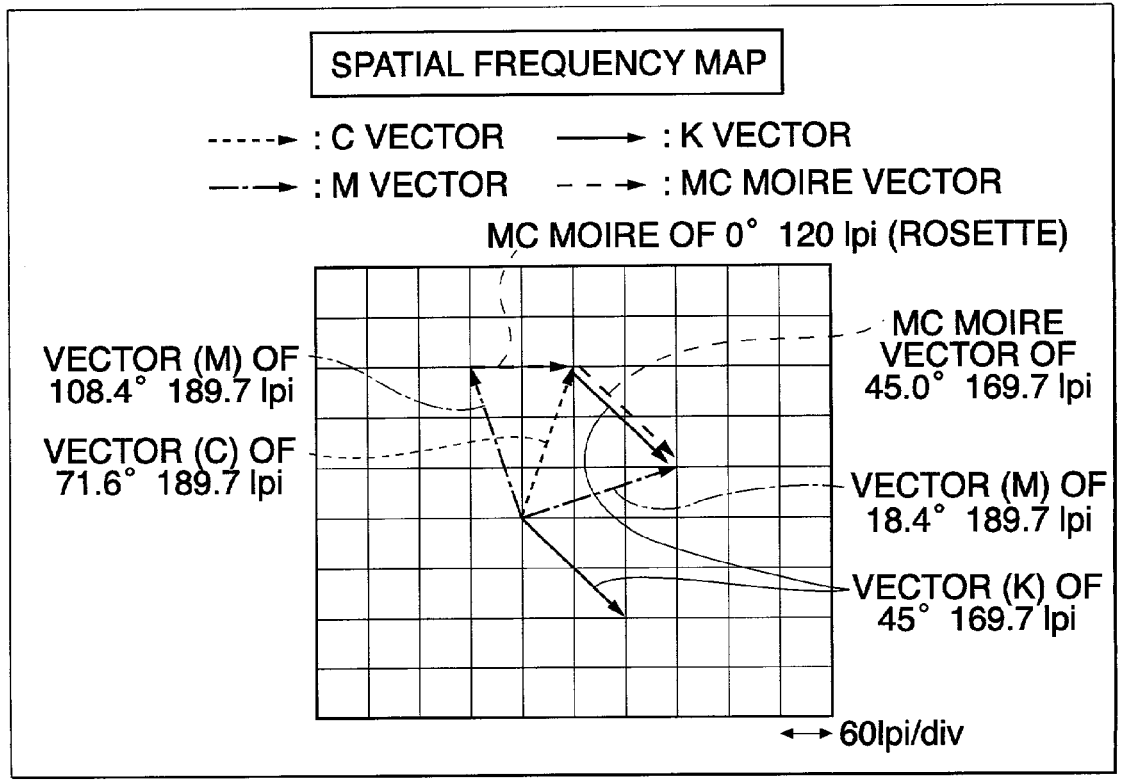
FIG. 8 is a vector representation of main spectrums of cyan, magenta, yellow, and black screens in a second embodiment.

FIG. 6 is a diagram showing a combination of the angles and line counts of cyan, magenta, yellow, and black screens in the second embodiment. FIG. 7 is a schematic diagram of a two-dimensional array of cyan, magenta, and black toner images. FIG. 8 is a vector representation of the directions and line counts of main spectrums obtained by Fourier transform for an image in which delta functions are set in the barycenter of cyan, magenta, and black screen cells.

It will be appreciated from the foregoing description that main spectrums of black screen cells are identical with differential spectrums between main spectrums of cyan and main spectrums of magenta, and the angle differences among the screens are in the range from about 25 to 40 degrees.

The color image forming device of the second embodiment produces images free of a pile height moire caused by an overlap of a yellow toner image and a toner image of another color and a moire at low-frequency areas. However, since the line counts of the colors are low, a moire may occur at 45 degrees and 84.9 lines. However, the moire, which is a high-order component, is low in contrast and inconspicuous.

[Third Embodiment]

This embodiment employs a multi-barycenter dot screen having multiple dot centers within a threshold matrix as disclosed in Japanese Published Unexamined Patent Application No. Hei 6-133156. This embodiment is the same as the first embodiment except for a portion related to screen structure, that is, the halftone generation part (the comparison unit 125 and the memory unit 126 in FIG. 2).

The screens of toner images of the individual colors have the same angles as those in the first embodiment, and the periodic structure of screen cells is twice that in the first embodiment. However, since one cell has four dot barycenters, main spectrums obtained by Fourier transform for an image in which a delta function is assumed to be set in the barycenter positions are substantially equal to those in the first embodiment.

The color image forming device of the third embodiment produces, by the above-described screens, smooth images that are free of pile height moires and conventional moires at low-frequency areas, and tone jump.

[Fourth Embodiment]

Cyan, magenta, and black screens in this embodiment are set in the same way as for those in the first embodiment. Output signals from the halftone generation part (the comparison unit 125 and the memory unit 126 in FIG. 2) for a yellow screen are made identical with those for a black screen.

Output signals from the halftone generation part for a yellow screen are stored in the image buffer 127, and sent to the laser driving circuit 135 synchronously with a page start signal and a scanning start signal. At this time, by changing the timing of issuing the page start signal and the scanning start signal to the timing of issuing those for a black image signal, the barycenter of a black toner dot exposure image and the barycenter of a yellow toner dot exposure image are brought 180 degrees out of phase.

The color image forming device of the fourth embodiment produces, by the dot exposure images, visually satisfactory images that are free of pile height moires and conventional moires at low-frequency areas.

[Fifth Embodiment]

This embodiment is the same as the first embodiment except for a portion related to screen structure, that is, the halftone generation part (the comparison unit 125 and the memory unit 126 in FIG. 2), and color screens are configured so that a rational tangent value of a cyan screen at a resolution of 1200 dpi is 8/2 in the fast-scanning and slow-scanning directions, a rational tangent value of a magenta screen is 2/8, and a rational tangent value of black and yellow screens is 6/6. Furthermore, the yellow and black screens are set so as to be 180 degrees out of phase.

As a result, the angles and line counts of the individual color screens are respectively 14.0 degrees and 145.5 lines for cyan, 76.0 degrees and 145.5 lines for magenta, and 45.0 degrees and 141.4 lines for yellow and black, so that the screen angles are within a desired range. However, differential spectrums between main spectrums of cyan and main spectrums of magenta are −45 degrees in angle and 149.9 lines in line count, which do not match those of main spectrums of black and yellow screens.

The color image forming device of the fifth embodiment produces images free of a pile height moire caused by an overlap of a yellow toner image and a toner image of another color. However, since differential spectrums between main spectrums of cyan and main spectrums of magenta do not match main spectrums of black and yellow screens, a moire occurs at low-frequency areas (8.5 lines, 45 degrees). However, since the moire is low contrast as a pile height moire and conventional moires do not occur in portions not having black toner image, an improvement can be made by performing inking as described below.

Specifically, in a color conversion part, inking is performed for color areas in which $C^*$ and $L^*$ are 40 or less. To be more specific, inking is performed only for a conical area formed by a vertex represented by $L^*=40$, $a^*=0$, and $b^*=0$ and a circular bottom face represented by $(a^{*2}+b^{*2})^{1/2}$. An inking ratio is 0% for conical surface and 100% for $L^*=0$, $a^*=0$, and $b^*=0$, and is linearly distributed for the area between them.

To perform inking for an arbitrary color area, flexible GCR is used for the inking. The flexible GCR is described in detail in "Fuji Xerox Technical Report, No. 11 (1996), pp. 26–33."

FIRST COMPARISON EXAMPLE

In the first comparison example, color screens are configured so that a rational tangent value of a cyan screen is 4/2 in the fast-scanning and slow-scanning directions, rational tangent values of a yellow screen are 3/3 and 4/4, a rational tangent value of a black screen is 5/0 in the fast-scanning and slow-scanning directions. In the first comparison example, since a low-frequency pile height moire occurs in a portion where a yellow screen and a cyan or magenta screen overlap, satisfactory images cannot be obtained.

SECOND COMPARISON EXAMPLE

Figure 9:
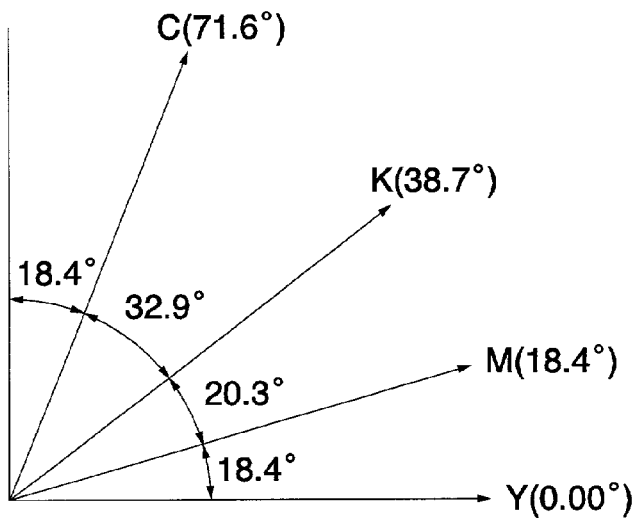
FIG. 9 is a diagram showing a combination of individual colors in a second comparison example.

FIG. 9 is a diagram showing a combination of the angles and line counts of cyan, magenta, yellow, and black screens in the second comparison example. Rational tangent values of the screens in the fast-scanning and slow-scanning directions are 2/6 for cyan, 6/2 for magenta, 6/0 for yellow, and 5/4 for black. The line counts and angles of the screens are respectively 71.6 degrees and 190 lines for cyan screen, 18.4 degrees and 190 lines for magenta screen, 0.0 degree and 200 lines for yellow screen, and 38.7 degrees and 187 lines for black screen.

Figure 10:
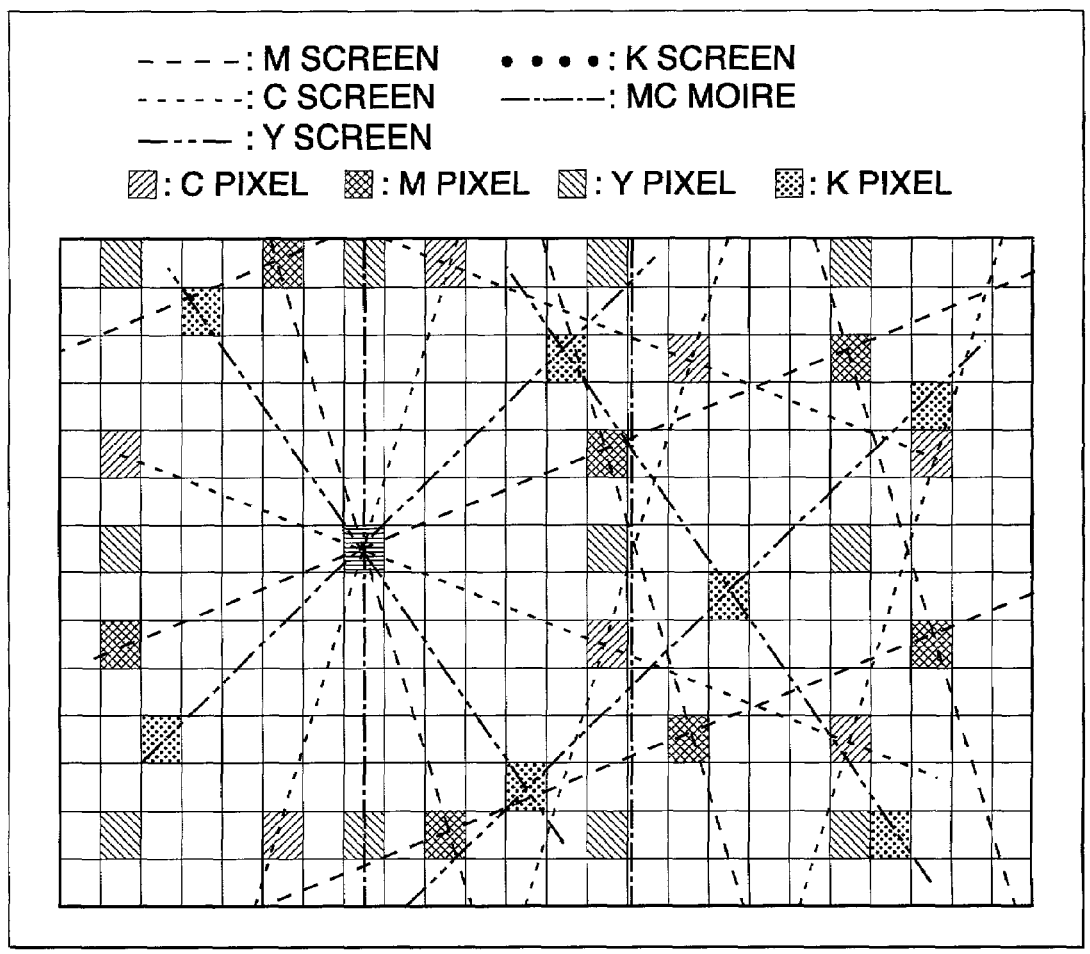
FIG. 10 is a schematic diagram showing a two-dimensional array of toner images of individual colors in a second comparison example.

FIG. 10 is a diagram showing a two-dimensional array of cyan, magenta, yellow, and black toner images created by using the screen set. Since the differences among screen angles cannot be set to exactly ±15 degrees and ±30 degrees, moires occur in low-frequency areas.

Figure 11:
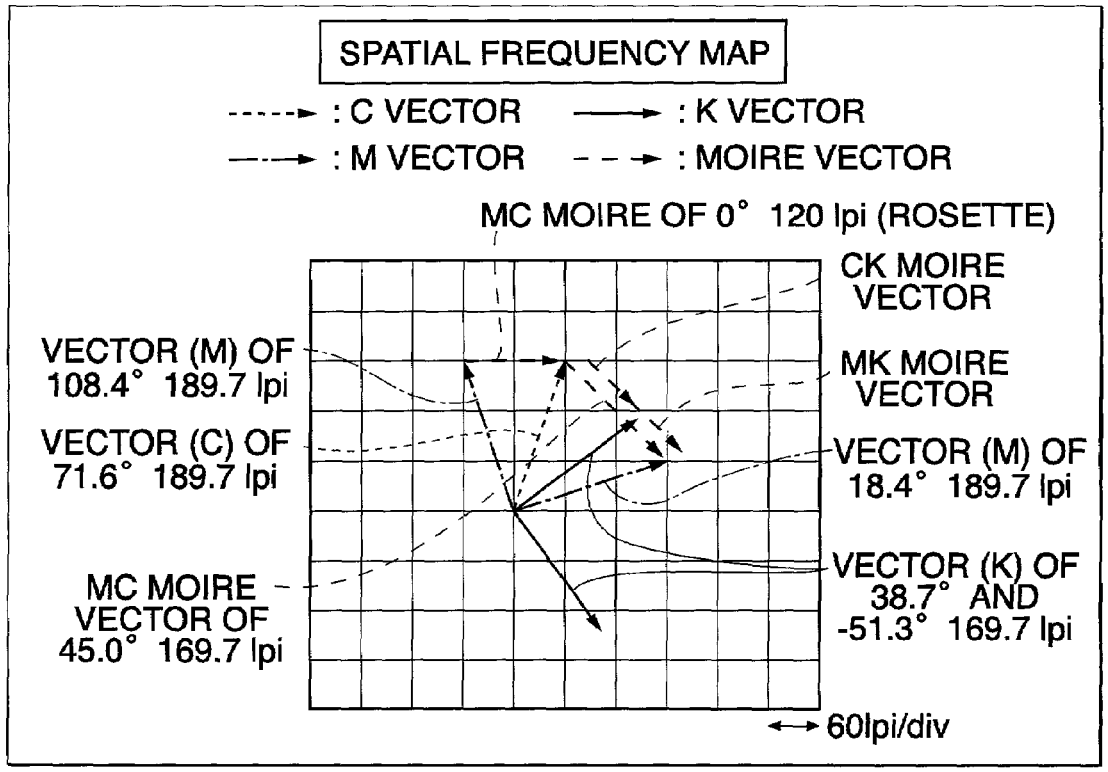
FIG. 11 is a vector representation of main spectrums of cyan, magenta, yellow, and black screens in a second comparison example.
Figure 12:
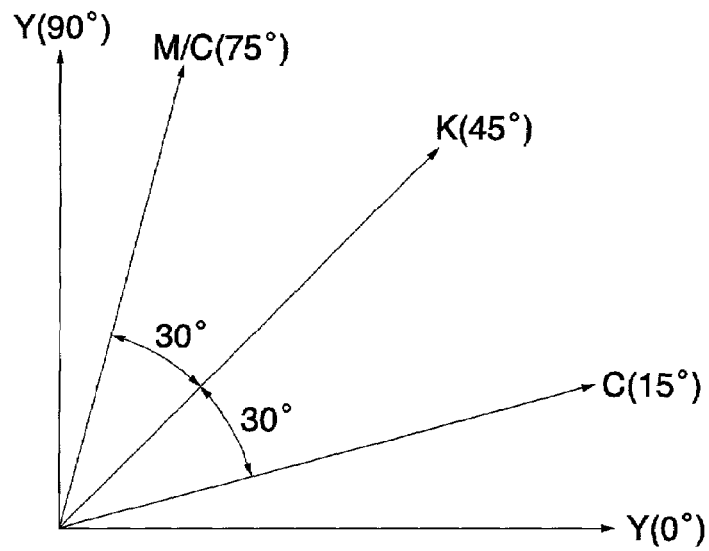

FIG. 11 is a vector representation of main spectrums of cyan, magenta, yellow, and black screens. In FIG. 11, the difference between two vectors, that is, a dashed line arrow indicates the direction and frequency of a moire. Particularly, since low-frequency moires are conspicuous, only low-frequency moires having short moire vectors were extracted. A tertiary color moire made up of a moire vector and a vector of a third color occur in very-low-frequency areas.

Also in the second comparison example, an image of the above-described screen structure created using the same color image forming device as that of the first embodiment except for a portion related to screen structure is unsatisfactory because a pile height moire and a conventional moire occur in low-frequency areas.

As has been described above, according to the present invention, pile height moires and conventional moires in low-frequency areas which are visually recognizable can be suppressed.

The entire disclosure of Japanese Patent Application No. 2000-298466 filed on Sep. 29, 2000 including specification, claims, drawings and abstract is incorporated herein by reference in its entirety.

What is claimed is:

1. A color image forming device which forms an output image corresponding to input image data on a recording medium using pigments of four colors cyan, magenta, yellow, and black, the color image forming device comprising:
   a color separation part that generates color image data separated by colors corresponding to the pigments of the four colors from the input image data, or obtains, as the input image data, color image data separated by colors corresponding to the pigments of the four colors; and
   an image forming part that, of the color image data generated or obtained by the color separation part, makes a screen angle of a first output image corresponding to the color image data of yellow identical with a screen angle of a second output image corresponding to the color image data of one of cyan, magenta, and black, and brings the screen of the first output image out of phase with the screen of the second output image.

2. The color image forming device according to claim 1, wherein the image forming part sets the differences among the screen angles of three output images corresponding to the color image data of cyan, magenta, and black in the range of about 25 to 40 degrees.

3. The color image forming device according to claim 1, wherein the image forming part comprises a halftone generation part that compares data for creating dot patterns having periodic structures corresponding to four colors cyan, magenta, yellow, and black with the four pieces of color image data generated or obtained by the color separation part, and generates halftone image data, and an image forming part that forms image data for image output, based on the halftone image data generated by the halftone generation part, wherein the screen angles and phases of the first and second output images, or the differences among the screen angles of output images corresponding to the color image data of cyan, magenta, and black are set by at least one of the halftone generation part and the image forming part.

4. The color image forming device according to claim 1, wherein the second output image corresponds to the color image data of black.

5. The color image forming device according to claim 1, wherein one of main spectrums of the screen of an output image corresponding to the color image data of yellow or black is the same as a differential spectrum between one of main spectrums of the screen of an output image corresponding to the color image data of cyan and one of main spectrums of the screen of an output image corresponding to the color image data of magenta.

6. The color image forming device according to claim 1, wherein each of the screens of four output images corresponding to the color image data of cyan, magenta, yellow, and black has 200 lines or more per inch.

7. The color image forming device according to claim 1, wherein the color separation part generates or obtains the color image data of black only in a low-brightness and low-chroma color area.

8. The color image forming device according to claim 7, wherein the color separation part generates or obtains the color image data of black only in a area where $C^*$ is 40 or less, and $L^*$ is 40 or less.

9. A color image forming method which forms an output image corresponding to input image data on a recording medium using pigments of four colors cyan, magenta, yellow, and black, the color image forming method comprising the steps of:
   making a screen angle of a first output image corresponding to the color image data of yellow identical with a screen angle of a second output image corresponding to the color image data of one of cyan, magenta, and black; and
   bringing the screen of the first output image about 150 degrees or more and about 210 degrees or less out of phase with the screen of the second output image.

10. The color image forming method according to claim 9, comprising the step of:
    setting the differences among the screen angles of three output images corresponding to the color image data of cyan, magenta, and black in the range of about 25 to 40 degrees.

11. The color image forming method according to claim 9, wherein one of main spectrums of the screen of an output image corresponding to the color image data of yellow or black is the same as a differential spectrum between one of main spectrums of the screen of an output image corresponding to the color image data of cyan and one of main spectrums of the screen of an output image corresponding to the color image data of magenta.

12. The color image forming method according to claim 9, forming an output image corresponding to the color image data of black only in a low-brightness and low-chroma color area.

* * * * *